US011734523B2

(12) United States Patent
Klonsinski et al.

(10) Patent No.: US 11,734,523 B2
(45) Date of Patent: Aug. 22, 2023

(54) STORM DRAIN INFORMATION RFID TAG

(71) Applicant: Berntsen International, Inc., Madison, WI (US)

(72) Inventors: Michael Klonsinski, Belleville, WI (US); Jason Amos, Albertville, AL (US); Sumukh Ramesh, Madison, WI (US); William Rushing, Waunakee, WI (US)

(73) Assignee: BERNTSEN INTERNATIONAL, INC., Madison, WI (US)

( * ) Notice: Subject to any disclaimer, the term of this patent is extended or adjusted under 35 U.S.C. 154(b) by 549 days.

(21) Appl. No.: 16/440,111

(22) Filed: Jun. 13, 2019

(65) Prior Publication Data
US 2020/0394368 A1    Dec. 17, 2020

(51) Int. Cl.
| | |
|---|---|
| *G06K 7/10* | (2006.01) |
| *G06K 19/077* | (2006.01) |
| *B32B 27/06* | (2006.01) |
| *B32B 27/40* | (2006.01) |

(52) U.S. Cl.
CPC ......... *G06K 7/10099* (2013.01); *B32B 27/06* (2013.01); *B32B 27/40* (2013.01); *G06K 19/07773* (2013.01); *B32B 2307/204* (2013.01); *B32B 2307/208* (2013.01); *B32B 2307/71* (2013.01); *B32B 2519/02* (2013.01)

(58) Field of Classification Search
CPC .......... G06K 7/10099; G06K 19/07773; B32B 27/40; B32B 27/06; B32B 2307/208; B32B 2307/204; B32B 2307/71; B32B 2519/02
See application file for complete search history.

(56) References Cited

U.S. PATENT DOCUMENTS

| | | | |
|---|---|---|---|
| 7,768,400 B2 | 8/2010 | Lawrence et al. | |
| 8,502,678 B2 | 8/2013 | Brown et al. | |
| 9,590,306 B2 | 3/2017 | Brown et al. | |
| 2007/0096852 A1* | 5/2007 | Lawrence | .......... G06K 19/0776 333/195 |

OTHER PUBLICATIONS

DAS Manufacturing, Inc.; "Storm Drain Markers—das Curb Markers—Storm Drain Markers for public works and utility"; www.dasmanufacturing.com/storm_drain.html; webpage printed on Aug. 8, 2019—(4) pages.

* cited by examiner

*Primary Examiner* — Quan Zhen Wang
*Assistant Examiner* — Rajsheed O Black-Childress
(74) *Attorney, Agent, or Firm* — Boyle Fredrickson, S.C.

(57) ABSTRACT

An RFID tag for marking storm drains incorporates the tag circuitry into a dome decal providing a flexible substrate capped by a self-leveling clear polymer. The RFID tag is placed between the polymer and the substrate on an electromagnetic radiation decoupling layer allowing a low profile fitting within the decal while allowing the decal to be used on metal drain surfaces. The decal includes a printed environment-promoting message relating to connection of the storm.

19 Claims, 3 Drawing Sheets

STORM DRAIN INFORMATION RFID TAG

BACKGROUND OF THE INVENTION

The present invention relates to a patrol key system for storm drains to ensure they are regularly inspected and cleared and in particular to an RFID tag patrol key adapted for storm drain use.

Storm drains are typically placed along the gutter regions of streets and other paved surfaces to prevent flooding caused by the watershed by impermeable paved areas, The storm drains conduct excess rain and groundwater away from the pavement to an inlet connecting with a below grade catch basin in turn connected to an underground storm sewer system. Often the storm sewer system, intended for substantially pure rainwater, leads directly to a river or stream.

The storm drain inlet may have a grating, typically flush with the pavement, to allow water flow therethrough while blocking debris and the like. The grating may be associated with a curbside lintel having an opening under which water may also flow. The grating and lintel must be constructed of a sturdy material, such as cast-iron or reinforced concrete, to accommodate the weight of traffic and to absorb occasional inevitable impacts, for example, from debris thrown from the road, car tires, etc.

Storm drains are an important asset of the community and require regular inspection and clearing. In this regard, it may be desirable to mark the asset with an identification tag so that inspections and cleanings can be properly recorded. A common such marking is an RFID (radiofrequency identification) tag having an internal identification number which may be read automatically by an RFID reader and thus may provide an automatic or semiautomatic logging of inspection and cleaning functions. For this purpose, passive RFID tags are typically employed. These RFID tags do not require batteries or other independent sources of power but instead scavenge power from the radio signals emitted by the RFID tag reader. The scavenged power is used to activate the RFID tag circuitry to then re-transmit a stored code or other message to the RFID tag reader.

RFID tags for the purpose of marking outdoor assets are commercially available and may provide an RFID circuit and antenna encapsulated, for example, in a watertight plastic housing. When the tag is intended to be mounted on metal surfaces, the RFID circuit must be isolated from that metal surface Which will interfere with the necessary radio communication. An example tag suitable for this purpose may provide a compact housing roughly the size of a sugar cube having an adhesive backing for attachment to an asset.

SUMMARY OF THE INVENTION

The present inventors have recognized that current low cost RFID for outdoor use have a number of disadvantages with respect to storm drain marking. Their substantial thickness makes them susceptible to being sheared from the storm drain surface by glancing blows or crushed by impact forces which must be resisted by a small package area. While a small RFID tag is desirable for reasons of cost, it can require extra time for locating a small RFID tag for scanning and a small tag size can make it difficult to identify missing or damaged RFID tags in an auditing process. Using bright housing colors for the tag, on the other hand, can make the RFID tag a target for vandals and raises concern about aesthetics.

The present invention, rather than embedding the RFID tag in a small rigid container, places the RFID tag into a broad area of a flexible dome decal of a type currently used to advise the public that the storm drain leads to a natural waterway and should not be used for dumping. Such dome decals provide a thin polymer substrate coated with a thin self-leveling clear polymer material such as polyurethane that provides the dome effect. The result is a package that provides a broad adhesive area and low smooth profile that can deflect glancing blows that would cause a shearing of the dome decal from a surface and a broad upper area providing a tough surface spreading the force of impact blows. Inventors have determined that incorporating an RFID tag under the self-leveling coating of the flowable polymer is possible by using advanced dielectric blocking materials available with some RFID tags that allow the tag to provide a sufficiently low profile to fit within the flowing polymer.

Specifically then, the present invention in one embodiment provides a dome decal RFID marker having a flexible polymer substrate having a lower planar surface suitable for attachment by an adhesive to a planar surface of a storm drain and an electromagnetic radiation decoupling layer attached to an upper planar surface of the flexible polymer substrate. An RFID tag is attached to an upper surface of the electromagnetic radiation decoupling layer at a location of enhanced electromagnetic field when an electromagnetic field is directed downward toward the dome decal RFID marker, and a polyurethane protective layer is provided to seal the RFID tag's electromagnetic radiation decoupling layer to the flexible polymer substrate through viscous flow of the polyurethane protective layer prior to hardening.

It is thus a feature of at least one embodiment of the invention to provide a novel dome decal package fir RFID tags that may be used on metal surfaces through the use of a tag having an electromagnetic decoupling layer permitting it to be integrated beneath a self-leveling polyurethane material used for creating such dome decals.

The polyurethane protective layer may bond to the flexible polymer substrate to provide a watertight encapsulation of the RFID tag and forms an upwardly convex meniscus at a periphery of the flexible polymer substrate.

It is thus a feature of at least one embodiment of the invention to provide the RFID tag with protection against rain and water incident to storm drain use.

The RFID tag and electromagnetic radiation decoupling layer may have a periphery inset from the periphery of the flexible polymer substrate by at least 0.05 inches to be fully encapsulated by the polyurethane protective layer.

It is thus a feature of at least one embodiment of the invention to accommodate formation of the natural meniscus in the polyurethane layer without risk of exposure of the RFID tag or decoupling layer.

The upper surface of the polyurethane protective layer over a majority of area of the dome decal may be substantially flat, curving down at its periphery to seamlessly join with the periphery of the flexible polymer substrate.

It is thus a feature of at least one embodiment of the invention to provide a low-profile surface that offers force-spreading to downward blows over a large area in contrast to a surface that is elevated in the location of the RFID tag.

The thickness of the electromagnetic radiation decoupling layer and RFID tag perpendicular to the upper surface of the flexible polymer substrate is less than 0.1 inches.

It is thus a feature of at least one embodiment of the invention to provide an RFID tag that is sufficiently spaced from a metal surface to which the RFID marker may be attached to prevent interference with RF communication while still allowing the RFID tag to be smoothly encapsulated by a self-leveling polyurethane layer.

The upper planar surface of the flexible polymer substrate has an area of greater than 6 square inches.

It is thus a feature of at least one embodiment of the invention to provide a large contact area between the marker and the storm drain to ensure good adhesion to a rough and irregular surface.

The flexible polymer substrate is circular.

It is thus a feature of at least one embodiment of the invention to provide a shape that resists peeling from glancing blows in contrast to a square shape having exposed corners.

The dome decal RFID marker may include a printed layer over the flexible polymer substrate and visible through the polyurethane protective layer over a majority of the area of the flexible polymer substrate.

It is thus a feature of at least one embodiment of the invention to provide a versatile and aesthetically pleasing marker that can be tailored to a variety of uses, for example, by colored printed material.

The printed layer may be at least in part over the surface of the RFID tag and electromagnetic radiation decoupling layer to provide an uninterrupted printing over at least 75 percent of the area of the upper surface of the flexible polymer substrate.

It is thus a feature of at least one embodiment of the invention to maximize the printing area to provide messages that may be read intelligibly at a distance, for example, by pedestrians or individuals in a car.

The printed area provides a text message indicating that a storm drain leads to a waterway.

It is thus a feature of at least one embodiment of the invention to provide dual functionality of tag marking and providing important messages to the public.

The dome decal RFID marker may be flexible to the extent that it may be elastically flexed by hand into an arc having a radius of six inches without damage.

It is thus a feature of at least one embodiment of the invention to provide a flexible encapsulation of an RFID marker for outdoor use that can be better adhered to irregular surfaces and resist damage from impacts and the like.

The dome decal RFID marker may have a thickness of less than 0.25 inches.

It is thus a feature of at least one embodiment of the invention to provide an extremely low profile RFID tag for outdoor use to minimize the potential exposure to shear force glancing blows.

These particular objects and advantages may apply to only some embodiments falling within the claims and thus do not define the scope of the invention.

DETAILED DESCRIPTION OF THE PREFERRED EMBODIMENT

Figure 1:
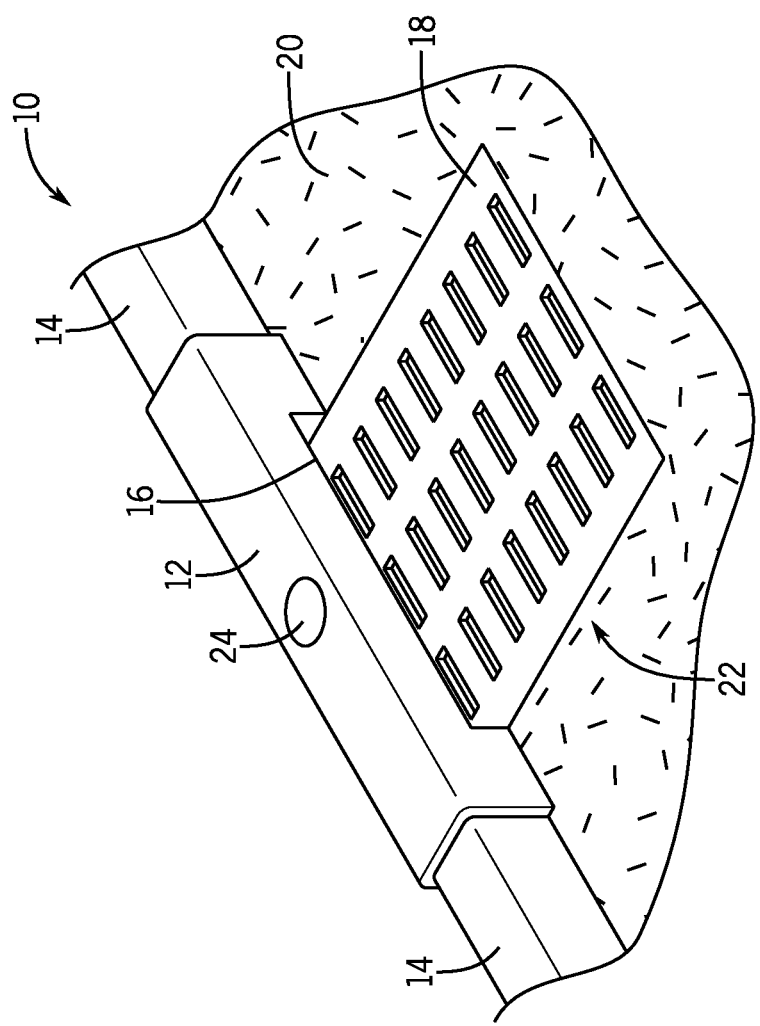
FIG. 1 is a perspective fragmentary view of an example storm drain showing a cast-iron lintel having an RFID marker per the present invention incorporating an RFID tag into a dome decal attached to the lintel.

Referring now to FIG. 1, an example storm drain 10 may provide a lintel 12 generally sized to be integrated between sections of curb 14 to provide a continuous curb structure. The lintel 12 may have a side inlet 16 facing the street and partially receiving a grating 18, both of which permit the inflow of water from the surface of the street 20 at a gutter region 22. Generally, the grating 18 may provide for a cast-iron planar plate with slotted openings that may be flush with the surface of the street 20 to receive water therefrom while providing a continuous street surface. The lintel 12 may be cast-iron, stone, concrete or the like.

The upper surface of the lintel 12 may provide for a relatively planar area removed from normal traffic and sized adequately to receive a storm drain marker 24 that can provide a message such as "no dumping" or "drains to water body," wherein the water body may be variously listed as river, ocean, creek, wetlands, and the like. Such storm drain markers may deter members of the public from inadvertently draining motor oil or other pollutants into the storm drain 10. The storm drain marker 24 in one embodiment may be circular and may have a diameter 25 of 4 inches so as to be readily visible and provide a large area for adhesion to the lintel 12. In some embodiments, the storm drain marker 24 will have an area of greater than 6 square inches and a thickness (measured vertically as depicted) of less than 0.25 inches. As positioned, the storm drain marker 24 may display a picture and printed message readable by pedestrians in the vicinity.

Figure 2:
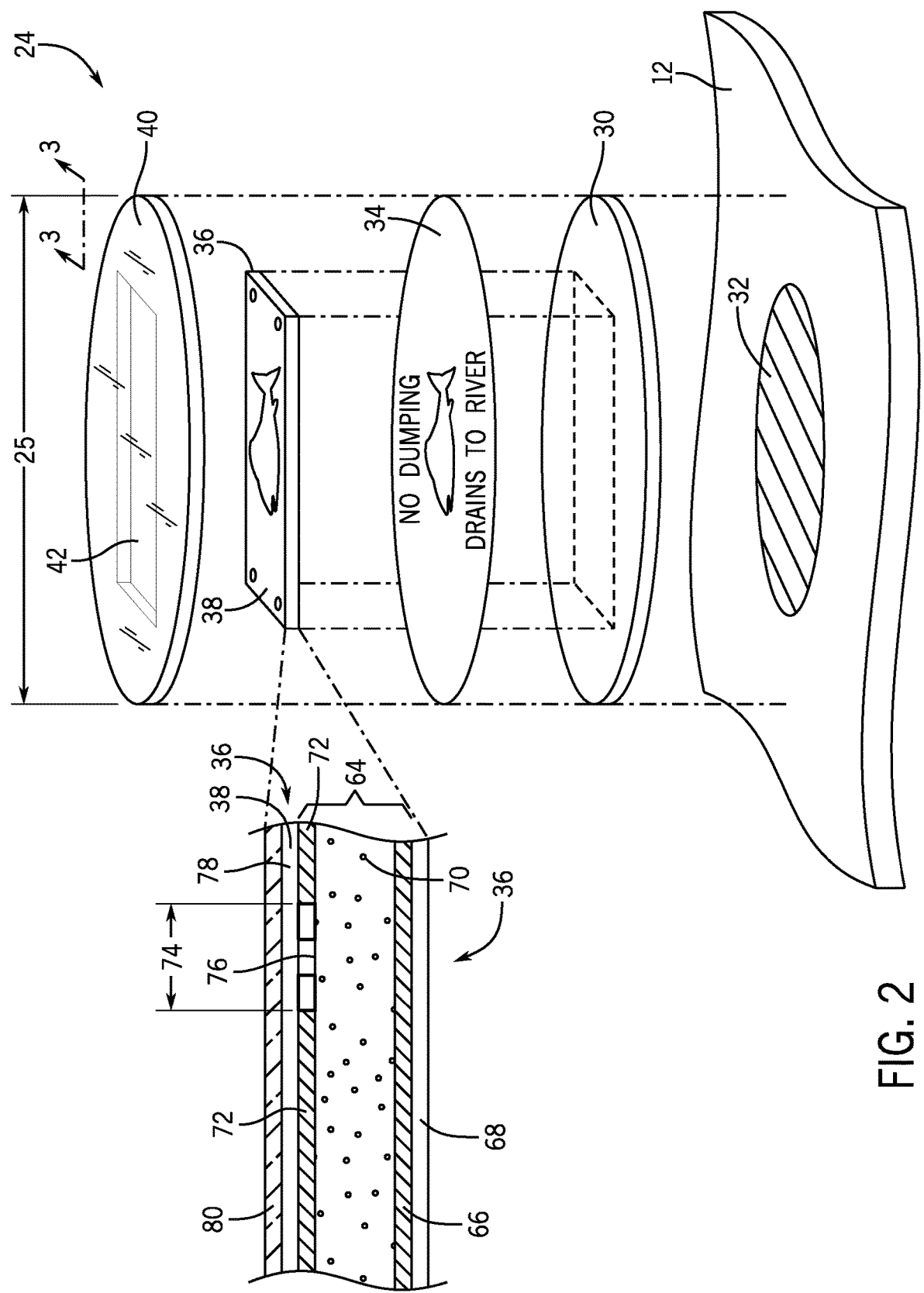
FIG. 2 is an exploded perspective view of the multiple layers of the marker providing an inset showing the layers of the RFID tag.

Referring now to FIG. 2, the storm drain marker 24 may be constructed on a substrate 30, for example, being a disk of flexible, opaque white plastic such as Vinyl, polyester, acrylic polycarbonate, or the like. A lower surface of the substrate 30 may be adhered to the lintel 12, for example, by a vinyl or urethane space-filling adhesive 32 that may be spread over a broad area to provide good contact with an irregular or poor surface and to resist dislodgment.

An upper surface of the substrate 30 may be attached to a printed layer 34 either being directly printed or silkscreened to the upper surface of the substrate 30 or printed to a thin film material such as paper, vinyl, or the like and adhered to that upper surface of the substrate 30. In a preferred embodiment, the upper surface of the printed layer 34 displays a message of no dumping, as discussed above, and is rendered in bright colors to be attractive and to distinguish itself from stenciled messages which have been compared to the appearance of graffiti. The printed layer 34 may be printed in ultraviolet resistant dies or may have a clear coat of ultraviolet blocking material otherwise transparent to visible light.

Attached to an upper surface of the printed layer 34 or at an appropriately sized gap in the printed layer 34 to attach directly to the substrate 30 is an RFID tag assembly 36 providing a UHF RFID tag. The RFID tag assembly 36 may store a unique serial number to identify the storm drain 10 as well as storm drain identification information such as GFS coordinates, maintenance schedule, last maintenance time, and the like.

Generally, the upper surface of the RFID tag assembly 36 may also provide a printed layer 38 visually compatible with and generally a continuation of printed layer 34 with respect to color scheme and registration. When assembled, the RFID tag assembly 36 and substrate 30 will thus provide for a continuous and uninterrupted visual message. Again the printed layer 38 on the upper surface of the RFID tag assembly 36 may be printed in the same inks as printed layer 34 that are resistant to ultraviolet fading or may have a clear coat ultraviolet blocking material that is nevertheless transparent to visible light.

An uppermost layer of the drain marker 24 is covered with a clear coating 40 of a self-leveling material being transparent and possibly including ultraviolet blocking dyes or the like. In one embodiment, the clear coating 40 may be a two-part flexible polyurethane material, for example, having an 82-45 shore DO hardness and preferably a hardness from 75-50. It will be appreciated that other self-leveling clear materials may be used including single part materials that are cured by heat or ultraviolet radiation, epoxies, and the like. Importantly, this clear coating 40 will be poured over the assembly of the substrate 30 printed layer 34 and RFID tag assembly 36 as a viscous flowable liquid to cover and coat these elements. When hardened to a solid, the clear coating 40 will include a pocket 42 into which the RFID tag assembly 36 fits by virtue of flowing around that RFID tag assembly 36 and conforming thereto.

Figure 3:
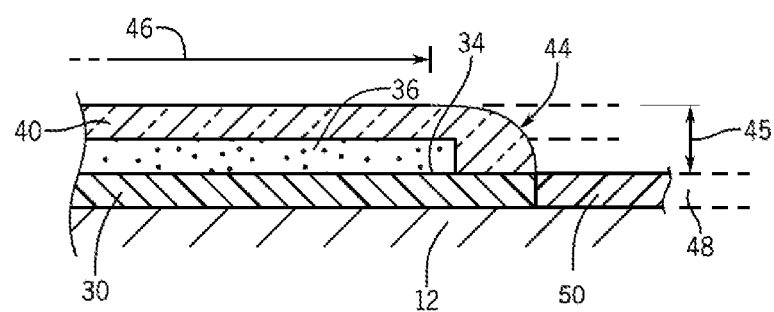
FIG. 3 is a fragmentary cross-sectional view along line 3-3 of FIG. 2 of the marker when assembled showing the low profile dome surface that is highly resistant to shear and encapsulates the RFID tag against water damage.

Referring also to FIG. 3, the self-leveling material of the clear coating 40 may be naturally contained to the periphery of the substrate 30 by surface tension to provide a smooth peripheral meniscus region 44 tapering down from a height 45 of a central region 46 of the marker 24 to the height 48 of the substrate 30 and sealing tightly to the substrate 30 in the periphery region 44 to surround the RFID tag assembly 36 and together with the substrate 30 seal the RFID tag assembly 36 from moisture. In this regard the substrate 30 may have a thickness less than 0.1 inches and preferably no greater than 0.05 inches, the total height of the drain marker 24 may be less than 0.25 inches, and the height 45 may be less than 0.1 inches.

This tapering downward in height of the clear coating 40 is naturally moderated by the surface tension of the self-leveling clear coating 40 and may be limited in radial extent by the sharp edge of the substrate 30 or by a repellent silicon coating 50 surrounding the substrate 30 before it has been cut free of a larger sheet of material. The RFID tag assembly 36 may be spaced in from the periphery of the substrate 30 by at least 0.05 inches so as to be within this meniscus by an amount ensuring coverage of the edges of the RFID tag assembly 36.

The self-flowing properties and viscosity of the clear coating 40 are selected so that the height of the clear coating 40 in the central region 46 both over the RFID tag assembly 36 and the portions of the printed layer 34 not covered by the RFID tag assembly 36 have a substantially equal and constant thickness so as to prevent the formation of ridges that would provide catch points for objects sliding over the marker 24 and that would tend to cause it to shear or lift off. In addition, by providing a substantially constant thickness to the marker 24 surrounding and covering the RFID tag assembly 36, downward blows on the upper broad face of the RFID tag assembly 36 are distributed over a larger area of clear coating 40 to better resist crushing or damaging of the RFID tag assembly 36. In this regard and as will be discussed below, the RFID tag assembly 36 will be more elastic than the clear coating 40 so as to retract downward to allow force of any downward blows to be largely absorbed by shoulder regions of the clear coating 40 outside of the area of the RFID tag assembly 36.

Importantly the total height of the marker 24 is greatly limited to prevent it from catching on objects passing by such as would cause a shear force on its attachment to the curb 14. In some embodiments, the height of the RFID tag assembly 36 is limited to less than 0.2 inches and preferably less than 0.15 inches. This resistance to shear force blows is further enhanced by the curvature of the peripheral region noted above which resists creating perpendicular catch surfaces that would tend to leverage the marker 24 off of its curb 14.

In one embodiment the substrate 30 may have a height or thickness 48 of less than 0.7 inches, for example, being approximately 0.5 inches whereas the total thickness of the RFID tag assembly 36 may be less than 0.15 inches and preferably less than 0.12 inches. In this respect the clear coating may have a thickness of less than 0.6 inches and preferably less than 0.75 inches.

Figure 4:
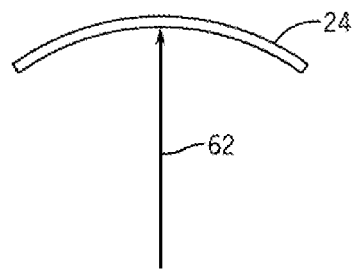
FIG. 4 is a diagrammatic representation of flexibility of the dome decal being adequate to conform to multiple storm drain surfaces.

Referring momentarily to FIG. 4, preferably the marker 24 will provide a flexibility such that its broad surface can be curved about a 6 inch radius 62 and when released will return to a substantially flat configuration without damage, such damage being delamination or separation of the components of the marker 24, cracking, or damage to the internal RFID tag.

Referring again to FIG. 2, the RFID tag assembly 36 must be isolated from the lintel 12 to prevent interference between an electrically conductive lintel 12 such as cast iron and the received radiofrequency waves used to energize and read the RFID tag. This can be done by spacing the RFID tag by 10 to 15 mm from a rear surface of the substrate 30 to the detriment of producing a low profile, integrated dome decal package. Accordingly, the RFID tag assembly may include a dielectric blocker 64 designed to allow the RFID tag to be more closely proximate to a metal surface. This dielectric blocker 64 may provide a first metallic conductor 66, for example, a thin aluminum foil, attachable by an adhesive layer 68 to the upper surface of the printed layer 34. Above the first conductor 66 is a dielectric material 70, for example, a polymer foam being substantially nonconductive with voids to approximate dielectric qualities of a partial vacuum or gas. On top of the dielectric material 70 is a second conductive layer 72 (again being in one instance a thin aluminum foil) having a gap region 74 in which an RFID tag 76 is placed. A paper or other covering layer 78 may be placed over the conductive layer 72 and RFID tag 76 which may support printed layer 38 and a clearcoat material 80 as discussed above.

An RFID tag 76 incorporated on top of a dielectric blocker 64 and suitable for the present invention is commercially available from Omni-ID having a place of business in New York, United States, and is described in U.S. Pat. Nos. 7,768,400; 8,502,678 and 9,590,306 hereby incorporated by reference.

Through the use of a dielectric blocker 34 the total height of the RFID tag assembly 36 (that is, its thickness) may be as little as 0.25 inches and preferably less than 0.15 inches. Generally the area of the RFID tag will be less than 1/20 the area of the marker 24 and the area of the RFID tag assembly 36 will be less than one third of the area of the marker 24 so that the marker 24 provides a broad protective surface around these elements.

The resulting marker 24 is believed to be more resistant to damage and dislodgment and provide an unattractive target for vandalism or theft because it is cosmetically attractive, socially beneficial, and of evident low value (being plastic materials rather than metals or the like).

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:
1. A dome decal RFID marker comprising:
    a flexible polymer substrate having a lower planar surface suitable for attachment by an adhesive to a planar surface of a storm drain;
    an electromagnetic radiation decoupling layer attached to an upper planar surface of the flexible polymer substrate;
    an RFID tag attached to an upper surface of the electromagnetic radiation decoupling layer at a location of enhanced electromagnetic field when an electromagnetic field is directed downward toward the dome decal RFID marker; and
    a polyurethane protective layer sealing the RFID tag and the electromagnetic radiation decoupling layer to the flexible polymer substrate through viscous flow of the polyurethane protective layer prior to hardening.
2. The dome decal RFID marker of claim 1 wherein the polyurethane protective layer bonds to the flexible polymer substrate to provide a watertight encapsulation of the RFID tag and forms an upwardly convex meniscus at a periphery of the flexible polymer substrate.
3. The dome decal RFID marker of claim 2 wherein the RFID tag and electromagnetic radiation decoupling layer have a periphery inset from the periphery of the flexible polymer substrate by at least 0.05 inches to be fully encapsulated by the polyurethane protective layer.
4. The dome decal RFID marker of claim 2 wherein upper surface of the polyurethane protective layer over a majority of area of the dome decal is substantially flat curving down at its periphery to seamlessly join with the periphery of the flexible polymer substrate.
5. The dome decal RFID marker of claim 4 wherein the thickness of the electromagnetic radiation decoupling layer and RFID tag perpendicular to the upper surface of the flexible polymer substrate is less than 0.1 inches.
6. The dome decal RFID marker of claim 5 wherein an upper planar surface of the flexible polymer substrate has an area of greater than 6 square inches.
7. The dome decal RFID marker of claim 6 wherein the flexible polymer substrate is circular.
8. The dome decal RFID marker of claim 1 further including a printed layer over the flexible polymer substrate and visible through the polyurethane protective layer over a majority of an area of the flexible polymer substrate.
9. The dome decal RFID marker of claim 8 wherein the printed layer is at least in part over the surface of the RFID tag and electromagnetic radiation decoupling layer to provide an uninterrupted printing over at least 75 percent of the area of the upper surface of the flexible polymer substrate.
10. The dome decal RFID marker of claim 9 wherein the printed area provides a text message indicating that a storm drain leads to a waterway.
11. The dome decal RFID marker of claim 1 wherein the dome decal RFID sensor can be elastically flexed by hand into an arc having a radius of six inches without damage.
12. The dome decal RFID marker of claim 1 wherein the dome decal RFID marker has a thickness less than 0.25 inches.
13. The dome decal RFID marker of claim 1 wherein the RFID tag is a UHF RFID tag.
14. The dome decal RFID marker of claim 1 wherein the electromagnetic radiation decoupling layer provides at least one dielectric layer sandwiched between a first and second conductive layer where the first conductive layer has an area of absence where it does not overlie the dielectric layer to create the location of enhanced electromagnetic field.
15. The dome decal RFID marker of claim 14 wherein the dielectric layer is a polymer foam material.
16. The dome decal RFID marker of claim 1 wherein the flexible polymer substrate is an opaque white disk.
17. The dome decal RFID marker of claim 1 further including an adhesive joining the electromagnetic radiation decoupling layer with the flexible polymer substrate and a second adhesive layer joining the electromagnetic radiation decoupling layer with the RFID tag.
18. The dome decal RFID marker of claim 1 wherein the RFID tag is covered by a printable opaque white sheet.
19. The dome decal RFID marker of claim 1 wherein including a UV blocking material positioned above the flexible polymer substrate.

* * * * *